(12) United States Patent
Anderson et al.

(10) Patent No.: US 9,136,689 B2
(45) Date of Patent: Sep. 15, 2015

(54) PROTECTING ELECTRONIC DEVICES FROM ELECTRICAL SUPPLY DISTURBANCES

(75) Inventors: Jason L. Anderson, San Jose, CA (US); Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 13/276,393

(22) Filed: Oct. 19, 2011

(65) Prior Publication Data

US 2013/0103219 A1 Apr. 25, 2013

(51) Int. Cl.
*G06F 1/26* (2006.01)
*H02H 1/04* (2006.01)
*G06F 1/30* (2006.01)
*H02H 1/00* (2006.01)

(52) U.S. Cl.
CPC .. *H02H 1/04* (2013.01); *G06F 1/30* (2013.01); *H02H 1/0092* (2013.01)

(58) Field of Classification Search
None
See application file for complete search history.

(56) References Cited

U.S. PATENT DOCUMENTS

| | | | |
|---|---|---|---|
| 5,694,325 A * | 12/1997 | Fukuda et al. | 700/121 |
| 6,104,582 A | 8/2000 | Cannon et al. | |
| 6,304,823 B1 | 10/2001 | Smit et al. | |
| 6,522,981 B2 | 2/2003 | Smit et al. | |
| 6,633,472 B2 | 10/2003 | Lai | |
| 7,069,258 B1 | 6/2006 | Bothwell | |
| 7,225,088 B2 | 5/2007 | Smit et al. | |
| 7,920,997 B2 | 4/2011 | Domijan, Jr. et al. | |
| 8,503,137 B2 * | 8/2013 | Panetta | 361/10 |
| 2003/0169174 A1 | 9/2003 | Liebenow | |
| 2008/0125883 A1 * | 5/2008 | Gould et al. | 700/51 |
| 2009/0222142 A1 * | 9/2009 | Kao et al. | 700/291 |
| 2012/0113555 A1 * | 5/2012 | Mousavi et al. | 361/78 |

OTHER PUBLICATIONS

Peter Keefe, UK Combined Search and Examination Report, Application No. GB1218520.3, Dated Feb. 18, 2013, 5 pages.
Su Jun, Information Materials for IDS, SIPO Office Action Feb. 5, 2014, 2 pages.

* cited by examiner

*Primary Examiner* — Sean Shechtman
(74) *Attorney, Agent, or Firm* — William E. Schiesser; Keohane & D'Alessandro PLLC; Hunter E. Webb

(57) ABSTRACT

Embodiments of the present invention provide an approach for monitoring electrical disturbance (e.g., surges, outages, etc.) possibilities, and then automatically isolating electronic devices (also referred to herein as electronics) for the duration of the disturbance (or threat thereof). In a typical embodiment, a probability of an electrical disturbance occurring at a specified location will be determined. Then, a set of device protection profiles will be accessed. The set of device protection profiles comprises a set of thresholds and a corresponding set of device topologies associated with a set of electronic devices positioned. The set of thresholds in the set of device protection profiles will then be compared to the probability to identify a matching device topology from the set of device topologies. According to the matching device topology, at least one electronic device will be isolated from an electrical power source.

19 Claims, 16 Drawing Sheets

PROTECTING ELECTRONIC DEVICES FROM ELECTRICAL SUPPLY DISTURBANCES

TECHNICAL FIELD

In general, the present invention relates to electronic device protection. Specifically, the present invention relates to the protection of electronic devices from electrical disturbances or the like.

BACKGROUND

Electrical disturbances (e.g., power disruptions) may be detrimental to electronic devices connected to a line carrying increased energy. Effects may range from slightly damaging the electronics to rendering the electronics completely inoperable. Damaged electronics may cause fires or even hazardous amounts of electrical energy to individuals using those devices at the time of the disturbance. Causes of these electrical disturbances may range from lightning strikes to maintenance problems. Challenges may exist in providing a way to safely monitor electronics when electrical disturbances are likely to occur.

SUMMARY

Embodiments of the present invention provide an approach for monitoring electrical disturbance (e.g., surges, outages, etc.) possibilities, and then automatically isolating (e.g., disconnecting) electronic devices (also referred to herein as electronics) for the duration of the disturbance (or threat thereof). In a typical embodiment, a probability of an electrical disturbance occurring at a specified location will be determined. Then, a set of device protection profiles will be accessed from at least one computer storage device. In general, the set of device protection profiles comprises a set of thresholds and a corresponding set of device topologies associated with a set of electronic devices positioned at the specified location. The set of thresholds in the set of device protection profiles will then be compared to the probability to identify a matching device topology from the set of device topologies. According to the matching device topology, at least one electronic device may be isolated from an electrical power source. Optionally, the isolated device(s) may be switched from a wired mode to a wireless mode for continued functionality within the location.

A first aspect of the present invention provides a computer-implemented method for protecting electronic devices from electrical disturbances, comprising: determining a probability of an electrical disturbance occurring at a specified location; accessing a set of device protection profiles from at least one computer storage device, the set of device protection profiles comprising a set of thresholds and a corresponding set of device topologies associated with a set of electronic devices positioned at the specified location; comparing the set of thresholds in the set of device protection profiles to the probability to identify a matching device topology from the set of device topologies; and isolating at least one electronic device of the set of electronic devices from an electrical power source according to the matching device topology.

A second aspect of the present invention provides a system for protecting electronic devices from electrical disturbances, comprising: a memory medium comprising instructions; a bus coupled to the memory medium; and a processor coupled to the bus that when executing the instructions causes the system to: determine a probability of an electrical disturbance occurring at a specified location; access a set of device protection profiles from at least one computer storage device, the set of device protection profiles comprising a set of thresholds and a corresponding set of device topologies associated with a set of electronic devices positioned at the specified location; compare the set of thresholds in the set of device protection profiles to the probability to identify a matching device topology from the set of device topologies; and isolate at least one electronic device of the set of electronic devices from an electrical power source according to the matching device topology.

A third aspect of the present invention provides a computer program product for protecting electronic devices from electrical disturbances, the computer program product comprising a computer readable storage media, and program instructions stored on the computer readable storage media, to: determine a probability of an electrical disturbance occurring at a specified location; access a set of device protection profiles from at least one computer storage device, the set of device protection profiles comprising a set of thresholds and a corresponding set of device topologies associated with a set of electronic devices positioned at the specified location; compare the set of thresholds in the set of device protection profiles to the probability to identify a matching device topology from the set of device topologies; and isolate at least one electronic device of the set of electronic devices from an electrical power source according to the matching device topology.

A fourth aspect of the present invention provides a method for deploying a system for protecting electronic devices from electrical disturbances, comprising: providing a computer infrastructure being operable to: determine a probability of an electrical disturbance occurring at a specified location; access a set of device protection profiles from at least one computer storage device, the set of device protection profiles comprising a set of thresholds and a corresponding set of device topologies associated with a set of electronic devices positioned at the specified location; compare the set of thresholds in the set of device protection profiles to the probability to identify a matching device topology from the set of device topologies; and isolate at least one electronic device of the set of electronic devices from an electrical power source according to the matching device topology.

BRIEF DESCRIPTION OF THE DRAWINGS

These and other features of this invention will be more readily understood from the following detailed description of the various aspects of the invention taken in conjunction with the accompanying drawings in which.

Figure 1:
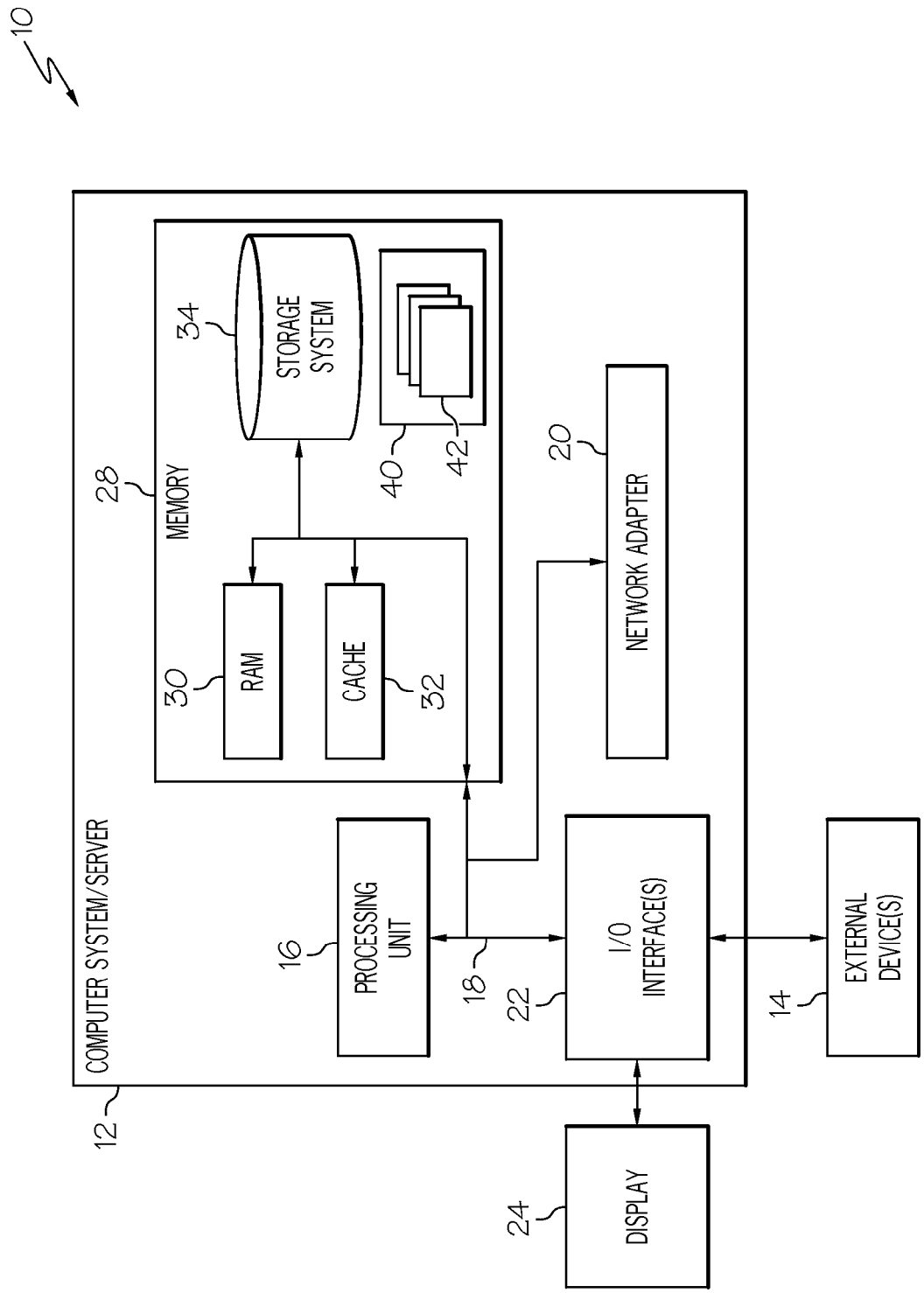
FIG. 1 depicts an illustrative computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention provide an approach for monitoring electrical disturbance (e.g., surges, outages, etc.) possibilities, and then automatically isolating (e.g., disconnecting) electronic devices (also referred to herein as electronics) for the duration of the disturbance (or threat thereof). In a typical embodiment, a probability of an electrical disturbance occurring at a specified location will be determined. Then, a set of device protection profiles will be accessed from at least one computer storage device. In general, the set of device protection profiles comprise a set of thresholds and a corresponding set of device topologies associated with a set of electronic devices positioned at the specified location. The set of thresholds in the set of device protection profiles will then be compared to the probability to identify a matching device topology from the set of device topologies. According to the matching device topology, at least one electronic device may be isolated from an electrical power source. Optionally, the isolated device(s) may be switched from a wired mode to a wireless mode for continued functionality within the location.

Referring now to FIG. 1, a schematic of an example of a computing node is shown. Computing node 10 is only one example of a suitable structure computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable structure for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable structure instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable structure combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable structure combination of the foregoing.

Device protection program/utility 40, having a set (at least one) of program modules 42, may be stored in memory 28 by way of example, and not limitation, as well as an operating system, one or more application programs, other program modules, and program data. In general, device protection program 40 performs the function of the present invention as described herein.

Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
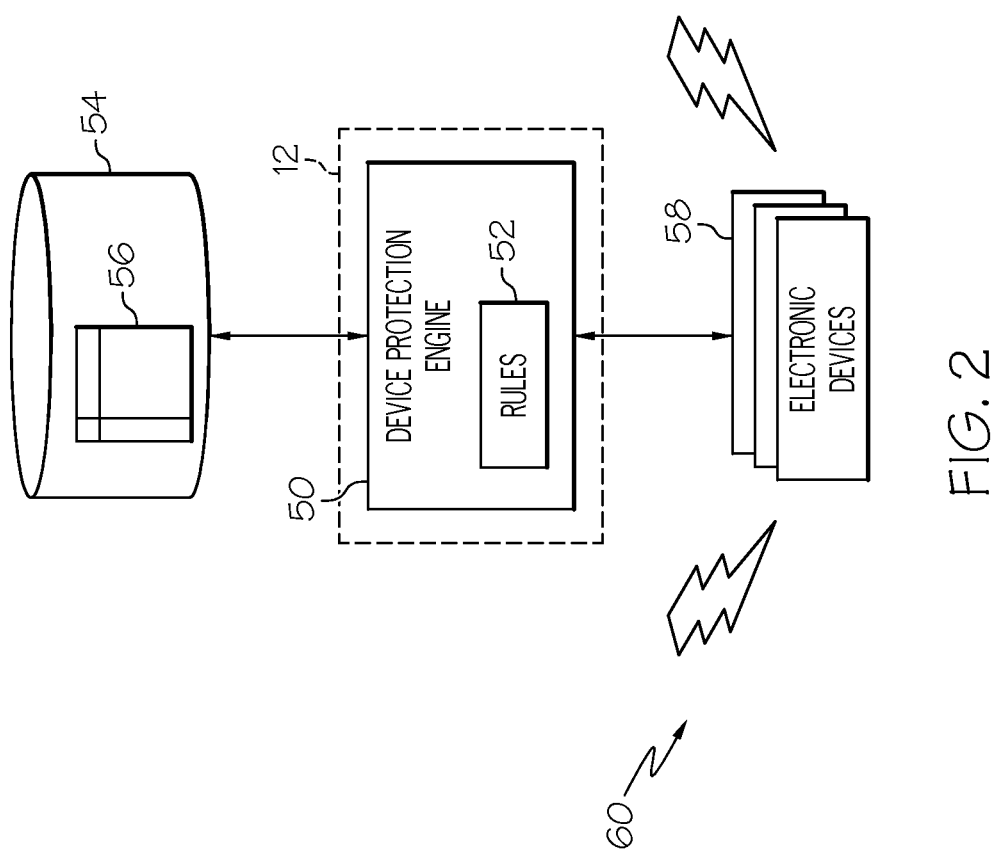
FIG. 2 depicts an illustrative system diagram according to an embodiment of the present invention.

Referring now to FIG. 2, a system diagram according to an embodiment of the present invention is shown. It is understood that the teachings recited herein may be practiced within a networked computing environment (e.g., a cloud computing environment). A stand-alone computer system/server 12 is shown in FIGS. 1 and 2 for illustrative purposes only. In the event the teachings recited herein are practiced in a networked computing environment, each client need not have a device protection engine (engine 50). Rather, engine 50 could be loaded on a server or server-capable device that communicates (e.g., wirelessly) with the clients to provide device protection therefor. Regardless, as depicted, engine 50 is shown within computer system/server 12. In general, engine 50 can be implemented as program 40 on computer system 12 of FIG. 1 and can implement the functions recited herein. As further shown, engine 50 (in one embodiment) comprises a rules and/or computational engine that processes a set (at least one) of rules 52 and/or provides device protection thereunder.

Along these lines, engine 50 may perform multiple functions similar to a general-purpose computer using rules 52. Specifically, engine 50 may (among other things): determine a probability of an electrical disturbance 60 occurring at a specified location; access a set of device protection profiles 56 from at least one computer storage device 54, the set of device protection profiles 56 comprising a set of thresholds and a corresponding set of device topologies associated with a set of electronic devices 58 positioned at the specified location; compare the set of thresholds in the set of device protection profiles 56 to the probability to identify a matching device topology from the set of device topologies 56; isolate at least one electronic device of the set of electronic devices 56 from an electrical power source according to the matching device topology; switch device(s) from wired mode to wireless; etc.

In any event, engine 50 will first determine a probability that an electrical disturbance 60 will occur. In general, there are multiple different ways to determine the percent likelihood of a disturbance occurring. For example, the probability could be determined based on weather patterns, maintenance schedules, or historical disturbance data. In a typical embodiment, the probability will be determined in real time or to anticipate a pending disturbance or outage.

Regardless, engine 50 will typically assign a probability/rating to the likelihood of a disturbance occurring. A rating of 0% means there is no probability of a disturbance occurring, whereas 100% means a disturbance is inevitable. Since this approach can enable the physical separation of all electronic devices where they connect to a wall outlet, there are a number of topological combinations (e.g., device topologies) of electronic devices connected/disconnected at any given point in time. Using a multiple threshold methodology, each threshold is mapped to a particular topology. As the likelihood increases, the topologies associated with the thresholds nay become more and more protected. A final threshold may result in a topology where all appliances are disconnected except for the safe monitoring management system.

These device topologies can be expanded into device protection and/or threshold profiles by including not just the topology of the devices connected, but also characteristics such as those described in the following non-exhaustive list:

1. The current time of day (e.g. keep lights available longer during dark hours).
2. The date and/or day of the week.
3. The number and/or ages of persons currently at the property.
4. The current power usage at the property.
5. The temperature within the property.

Figure 3:
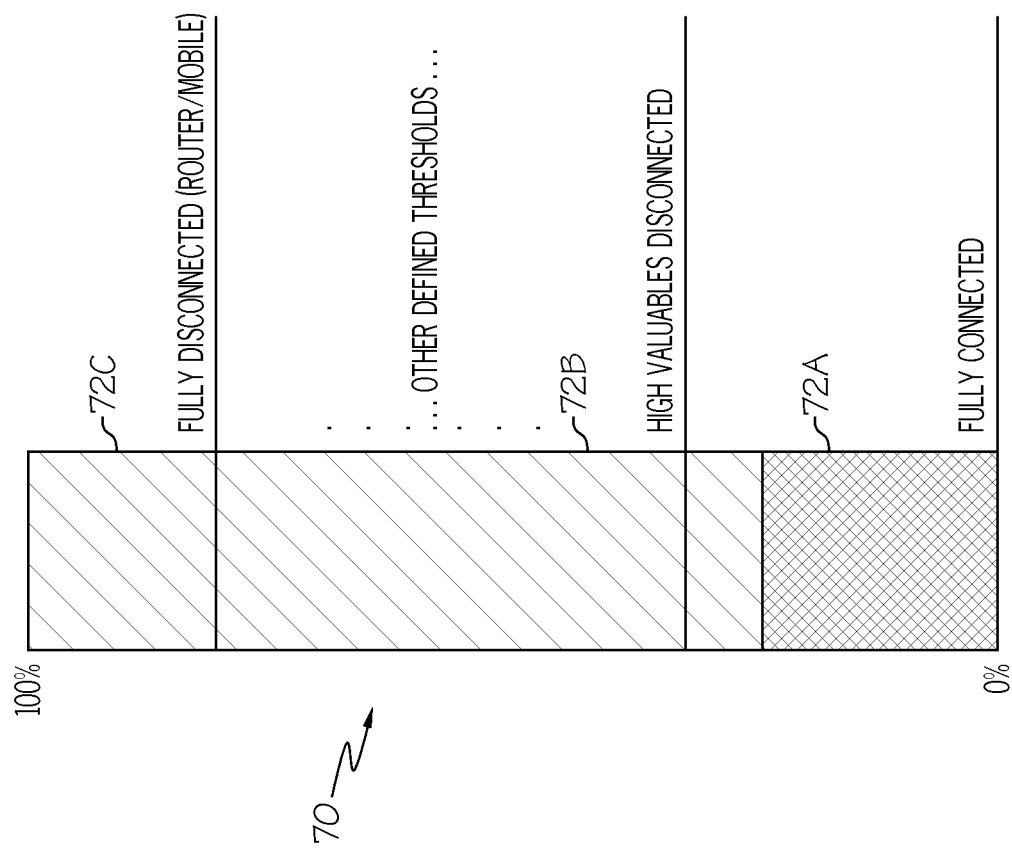
FIG. 3 depicts an illustrative threshold gauge according to an embodiment of the present invention.

Referring now to FIG. 3, the following is an example threshold configuration 70 with three distinct topologies 72A-C. In this example: device topology 72A corresponds to all electronic devices being connected; device topology 72B corresponds to highly valuable devices (e.g., computer, etc., as designated by the user/consumer) being isolated (e.g., disconnected from their electrical power source); and device topology 72C corresponds to all electronic devices being isolated/disconnected. In general, each device topology corresponds to a particular probability between 0% and 100% that an electrical disturbance will occur. Each association of a threshold and particular device topology generally constitutes a "device protection profile". Each profile may further include one or more of the characteristics listed above.

Figure 4:
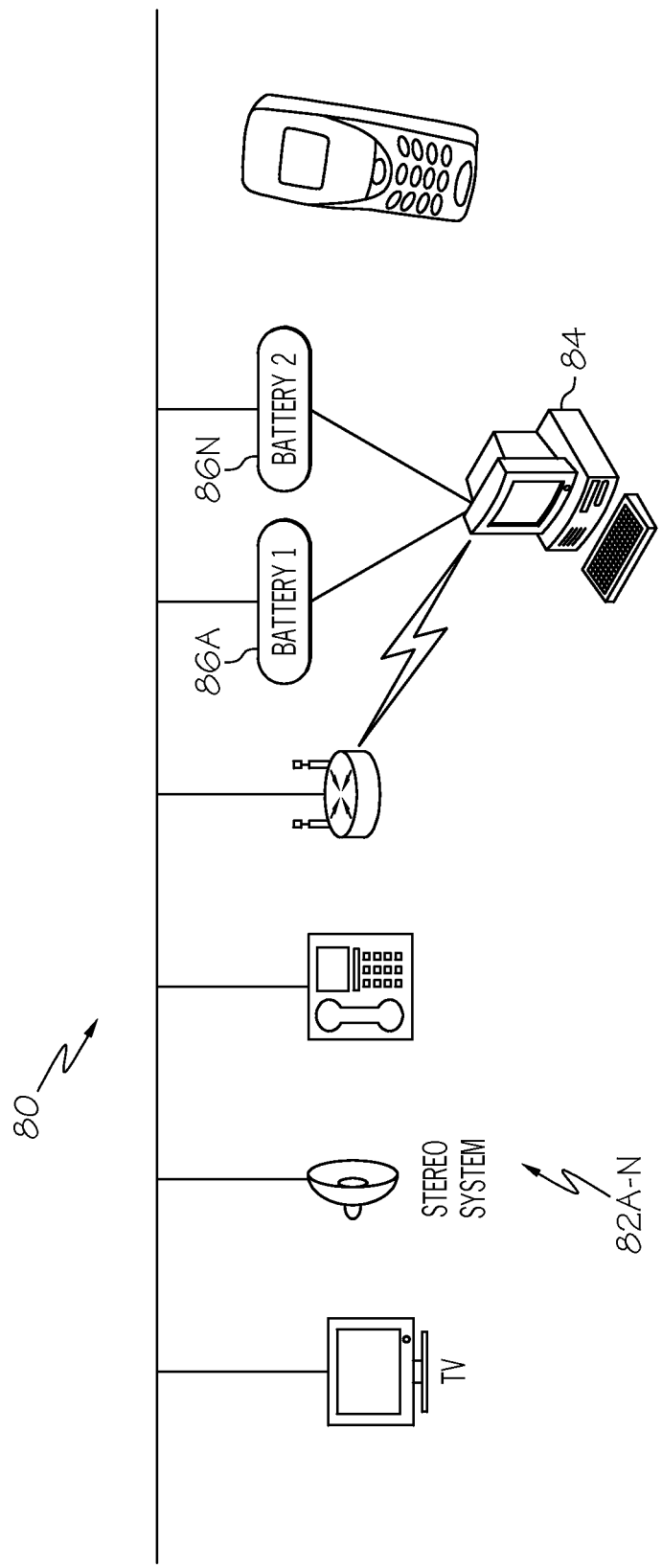
FIG. 4 depicts a nominal topology when all devices are connected according to an embodiment of the present invention.

Referring to FIGS. 4-7 illustrative device topologies are shown. FIG. 4 depicts a device topology 80 where all electronic devices 82A-N are connected to an electrical power source. In addition, management system/node 84 (e.g., computer system/server 12 of FIG. 1) is further connected to a set of batteries 86A-N so that it can continue to function in the absence of power. In general, device topology 80 corresponds to little or no risk of electrical disturbance (e.g., 0% or slightly greater risk) that falls within the full connection threshold 72A of FIG. 3.

Figure 5:
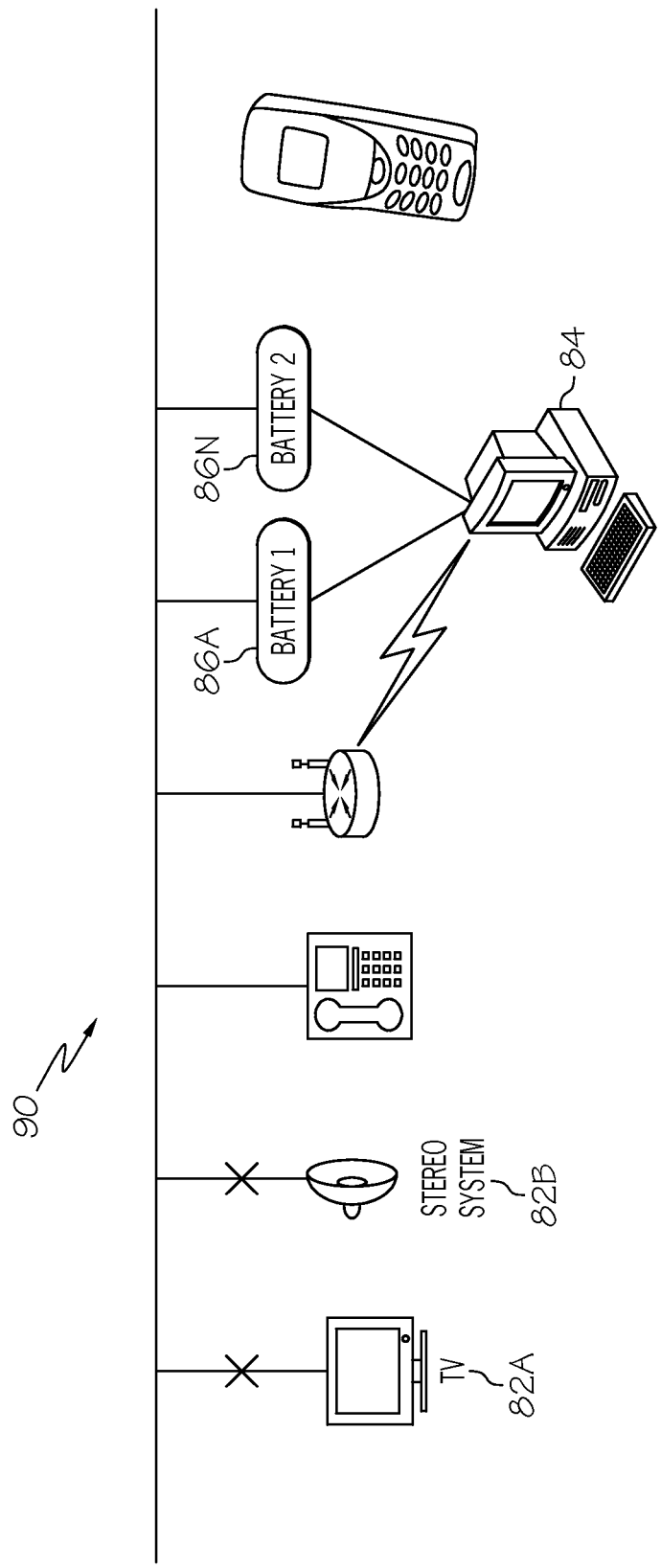
FIG. 5 depicts a topology when valuable devices are disconnected according to an embodiment of the present invention.

FIG. 5 depicts a device topology 90 where electronic devices 82A-B that are deemed highly valuable (e.g., as configured by the user and/or device owner) have been isolated from an electrical power source (e.g., disconnected). In addition, management system/node 84 (e.g., computer system/server 12 of FIG. 1) is further connected to a set of batteries 86A-N so that it can continue to function in the absence of power. In general, device topology 90 corresponds moderate risk of electrical disturbance (e.g., or slightly greater risk) that falls within the threshold 72B of FIG. 3.

Figure 6:
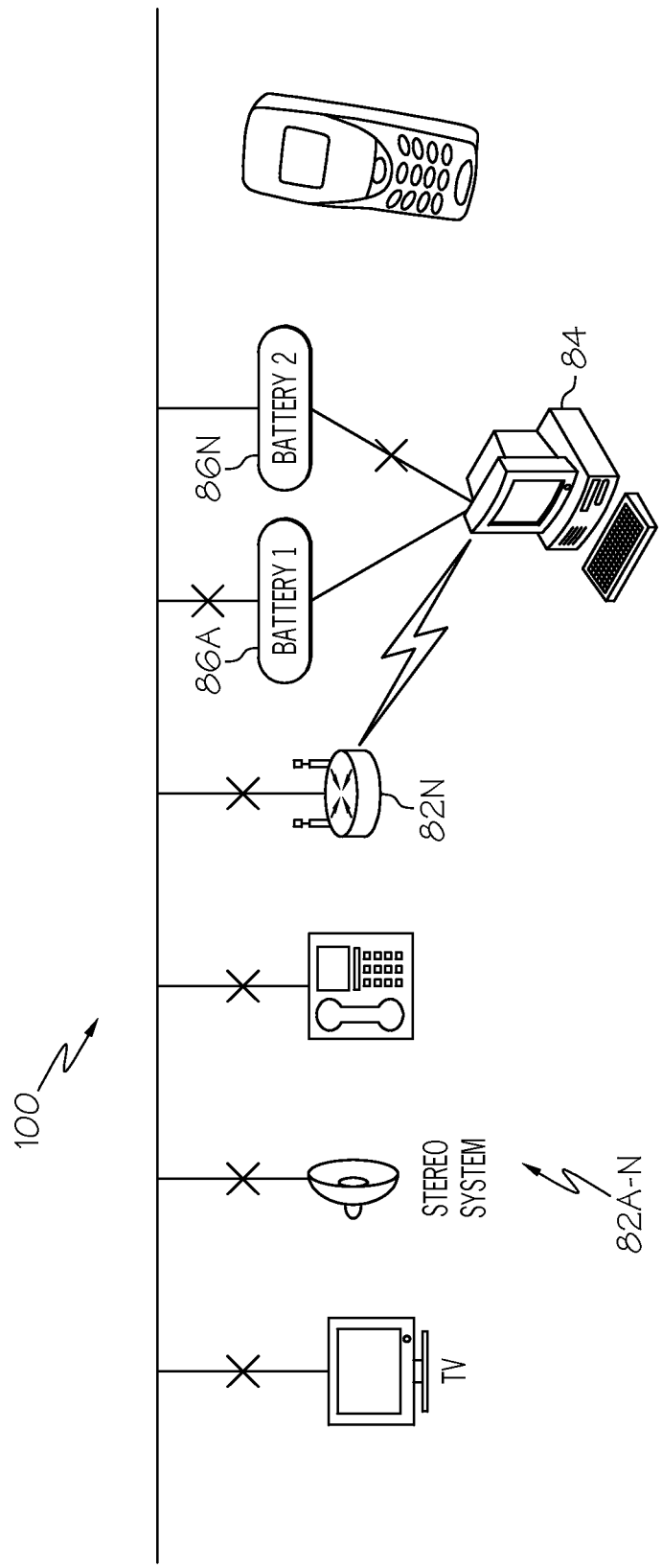
FIG. 6 depicts a topology where all devices are disconnected with the exception of intermittent router connectivity according to an embodiment of the present invention.
}

FIG. 6 first depicts a device topology 100 where all electronic devices 82A-N and battery 86A are disconnected from an electrical power source. However, management system/node 84 (e.g., computer system/server 12 of FIG. 1) remains connected to battery 86A so that it can continue to function in the absence of power, while being disconnected from battery 86N (which remains connected to the electrical power source). In general, device topology 100 corresponds to a high risk of electrical disturbance (e.g., approaching 100%) that falls within the full connection threshold 72C of FIG. 3. As further shown, management system 84 is "tethered/connected" to router 82N for periodic updates.

Figure 7:
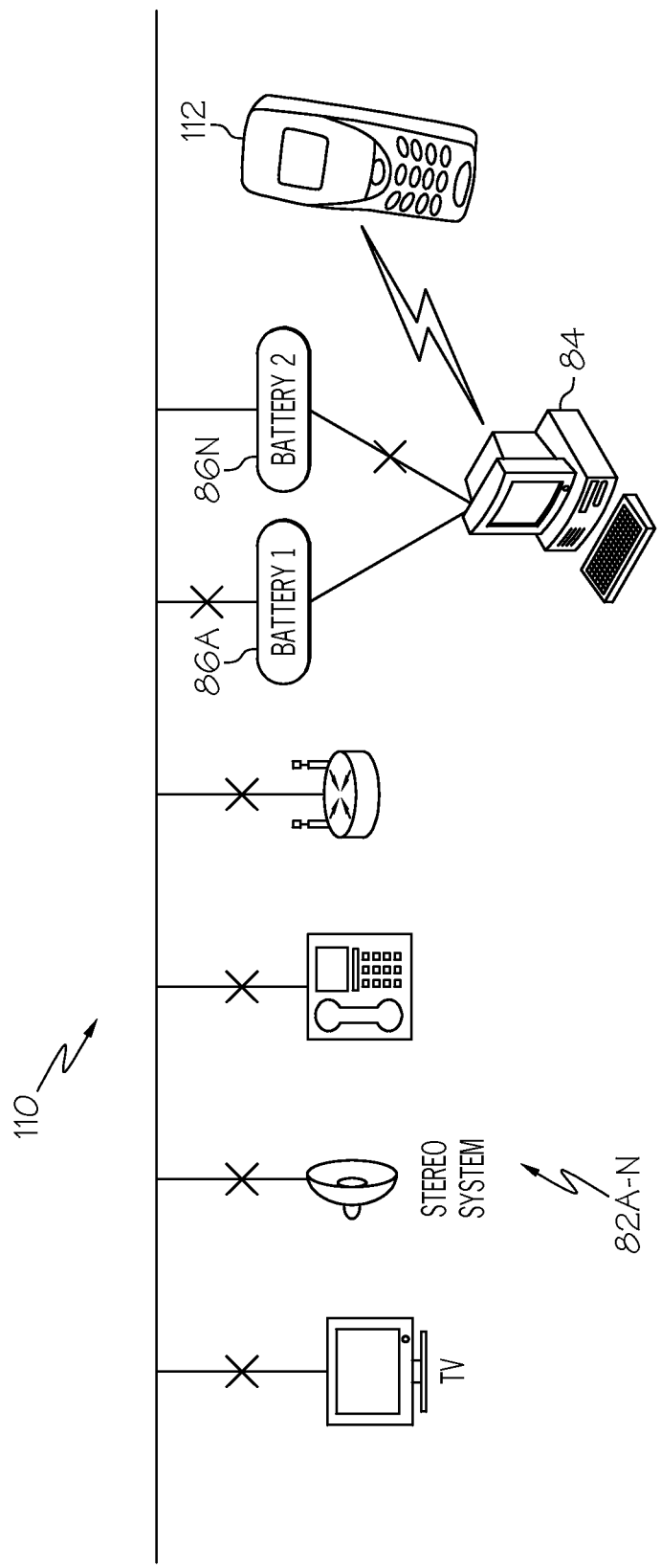
FIG. 7 depicts a topology with all devices connected and mobile device tethering according to an embodiment of the present invention.

FIG. 7 depicts a device topology 110 where all electronic devices 82A-N and battery 86A are disconnected from an electrical power source. However, management system/node 84 (e.g., computer system/server 12 of FIG. 1) remains connected to battery 86A so that it can continue to function in the absence of power, while being disconnected from batter 86N (which remains connected to the electrical power source). In general, device topology 110 corresponds to a high risk of electrical disturbance (e.g., approaching 100%) that falls within the full connection threshold 72C of FIG. 3. As further shown, management system 84 is "tethered/connected" to mobile device 112 for periodic updates.

In general, the control (e.g., connection and/or disconnection of electronic devices 82A-N) is provided via programmatically controlled (e.g., by management system 84) electrical and/or telephone outlets. Such an approach allows electronic devices 82A-N to be programmatically controlled so that that they may be physically disconnected during times of high risk power disturbances (such as lightning strikes). For instance, if a weather forecast predicts that thunderstorms and lightning are likely that could result in a devastating power disturbance, management system 84 can disconnect one or more devices Along these lines, management system 84 can be any computer with a control transceiver connection and an Internet connection to check the weather. Since management system 84 should remain online during the potential power disturbance timeframe to determine when it is safe to bring the other appliances back online, the configuration in FIG. 8 may be used. This configuration allows management system 84 to be physically disconnected from the power source while still having the other battery connected to recharge. When the one battery drops below a threshold, the batteries are switched.

Figure 8:
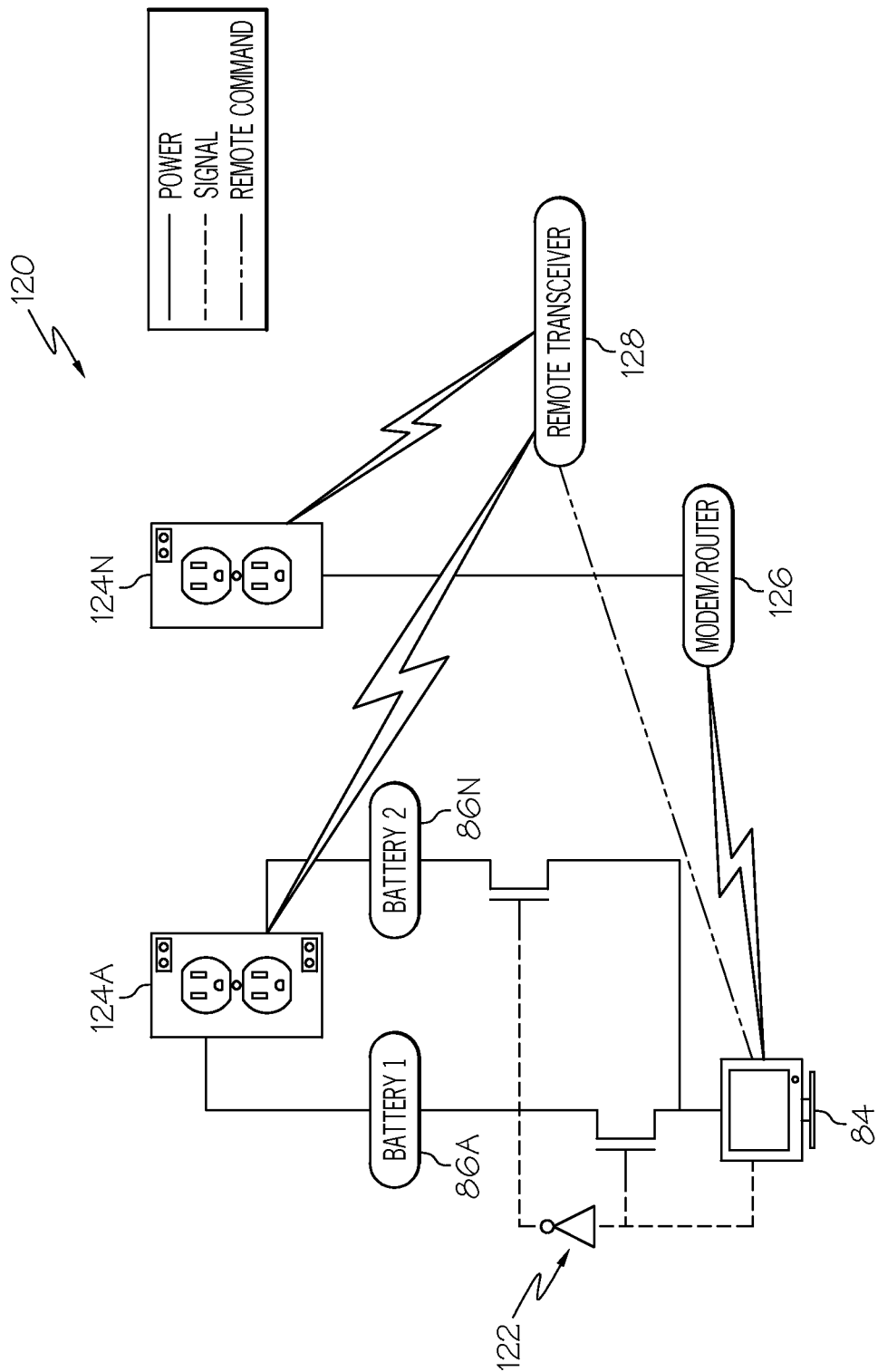
FIG. 8 depicts management setup and safety connections according to an embodiment of the present invention.

Referring now to FIG. 8, it is understood that configuration 120 may be scaled with N number of batteries appropriately. As depicted in configuration 120, management system 84 is coupled to dual addressable outlet 124A and via logic 122 and batteries 86A-N. In addition, a remote control signal couples management system remote transceiver 128, which is connected to dual addressable outlet 124A and single addressable outlet 124N via a wireless signal. Still yet, management system 84 is coupled via a wireless signal to modem/router 126 (e.g., for Internet connectivity), which itself is coupled to single addressable outlet 124N.

Shown below is an illustrative management system control algorithm. It is understood that this is only one illustrative example of how management system 84 could be implemented.

Function Prototypes/Descriptions:

disconnectAllDevices( )—This method disconnects all the outlets which have been registered with the management system. This protects the attached appliances more effectively from disturbances by physically disconnecting each device.

connectAllDevices( )—This method does substantially the opposite of disconnectAllDevices( ) in that it reconnects all the devices connected to a remote outlet.

disconnectModem( )—This method disconnects the modem so that it is safe from power disturbances. The modem is (dis)connected independently of all devices since the modem must be reconnected each time the management system wants to check for weather updates and other current conditions.

connectModem( )—This method does substantially the opposite of connectModem( ) in that it reconnects the modem so that the management system can check the weather forecast and other current conditions.

useMostChargedBattery( )—This method finds the battery with the most usable capacity and then connects it to the management system. The outlet which that battery is plugged into is then disconnected to prevent a disturbance from destroying the management system. The other batteries are then disconnected from the management system but are connected via the outlet for charging. This enables the management system to be isolated from the main power line but still continue its operations.

selectAllBatteries( )—This method connects all batteries together so that all the batteries are being charged and used by the management system at the same time.

Algorithm Steps:
1. selectAllBatteries( )
2. connectManagement( )
3. connectAllDevices( )
4. protectMode=false
5. While protection system is running do:
6. If protectMode==true then:
7. connectModem( )
8. curConditions=getCurrentConditions( )
9. if curConditions=getCurrentConditions( )
10. ifcurBatteryVoltage( )X % threshold then:
11. useMostChargedBattery( )
12. if protectMode==false then:
13. disconnectAllDevices( )
14. useMostChargedBattery( )
15. pretectMode=true
16. disconnectModem( )
17. sleep (e.g., 5 minutes)
18. else:
19. if protectMode==true then:
20. connectAll Devices( )
21. selectAll Batteries( )
22. protectMode=false
23. sleep (e.g., 20 seconds)

It is understood that any values hereinabove are for exemplary purposes only, and alternative values could be utilized.

In order to prevent management system 84 from automatically disconnecting potentially necessary devices, management system 84 is configurable such that a confirmation is sent to the home owner before disconnects occur. This can be accomplished via a smart phone application, a text message, email, etc. Moreover, this concept can be extended with policies and device grouping to make management easier. It is possible that an individual will be using a connected electronic device when a disconnection threshold is triggered. Given the solution thus far, an individual would be disconnected, and any existing state may be lost. One example involves an individual speaking on the phone and surfing the Internet when a disconnection threshold it triggered. At this time, both the call and the current Internet sessions are lost.

To avoid this, embodiments of the present invention further provide an approach for preserving connection state through the use of an off-site proxy. That is, all external connections are made through a gateway which can be disconnected and reconnected through different channels. In one case, an individual could do all of his/her web browsing through a reverse proxy. When the Internet connection must be switched from wired to wireless, the individual may drop the current proxy session, switch Internet connections, and then reconnect to the proxy. In this way, all Internet state is maintained via the proxy.

Shown below is one illustrative example of a reverse proxy switch connection algorithm:
Preconditions: All Internet activity is done through an off-site proxy.
1. Disconnect from current wired proxy session.
2. Switch from wired Internet connection to wireless.
3. Reconnect to proxy session using new wireless connection.

Figure 9:
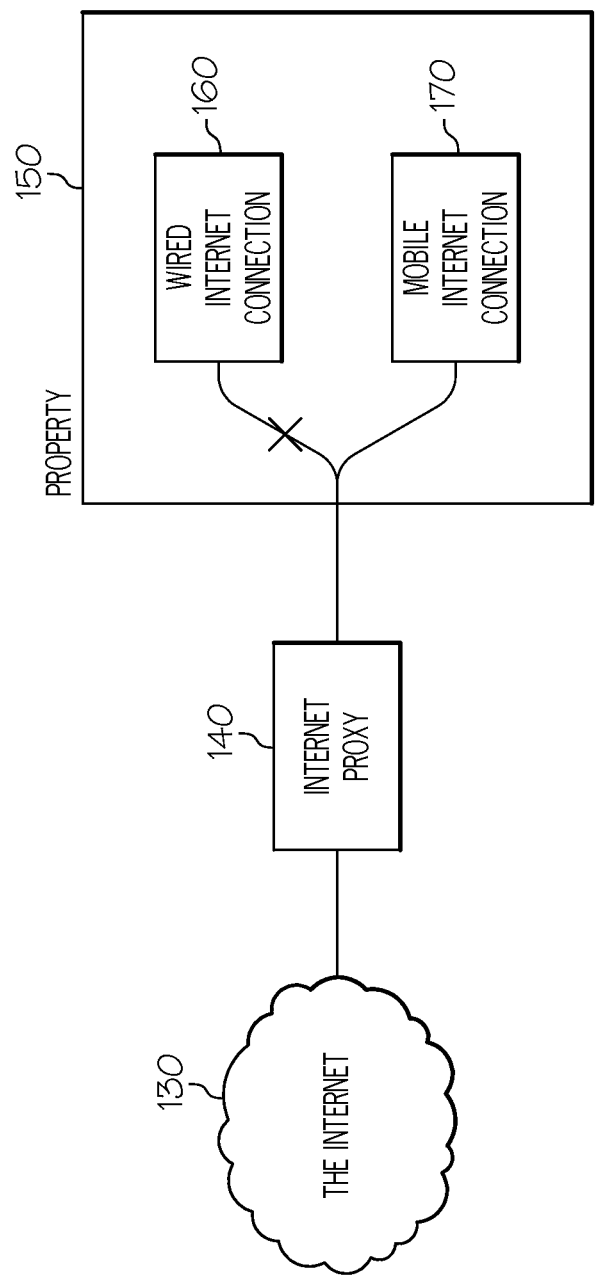
FIG. 9 depicts the switching between wired and wireless Internet connectivity according to an embodiment of the present invention.

With this algorithm, the individual would see a momentary lapse in responsiveness while the connections are being swapped. The remote proxy implementation may be implemented off-site using a proxy such as Squid proxy. This scenario is illustrated in FIG. 9. As depicted, the location/property 150 is connected to the Internet 130 via an Internet proxy 140. When power is lost at the property/location 150, Internet connectivity switches from wired Internet connection 160 to a mobile/wireless Internet connection 170.

Figure 10:
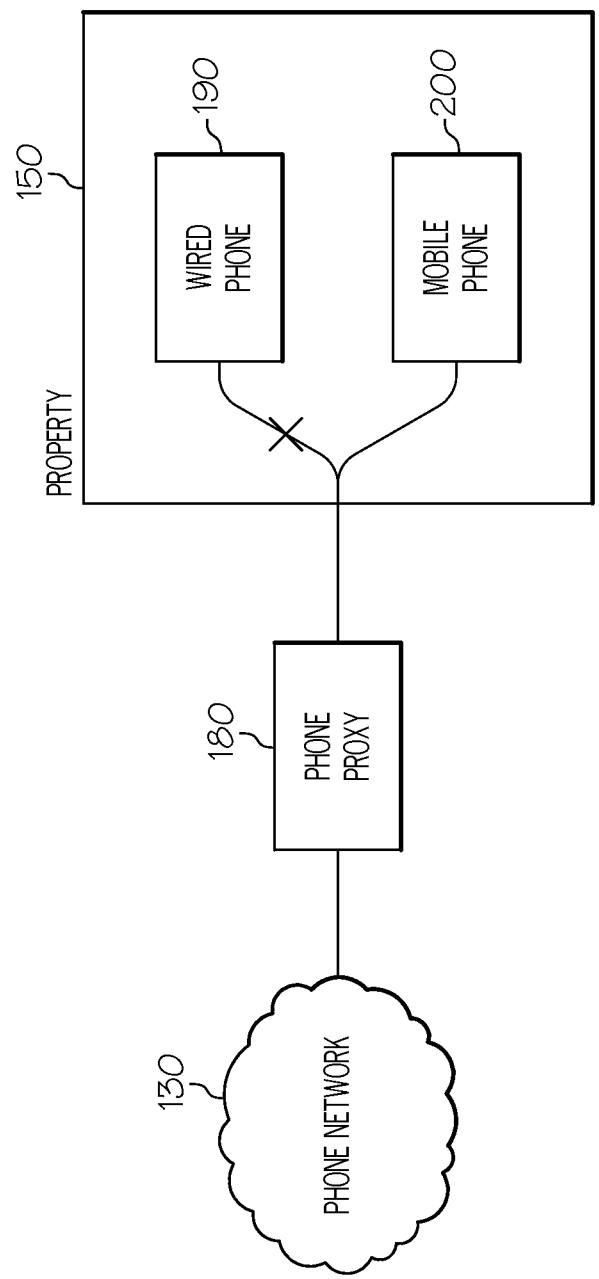
FIG. 10 depicts the switching between wired and wireless telephone services according to an embodiment of the present invention.

FIG. 10 shows a similar example, using a phone proxy. In general, this scenario may be implemented using a phone relay or through an existing proxy service. For example, assume that an individual is using an existing proxy service for a phone call through a channel which must be closed. The individual could then three-way call a second number through a wireless channel. Once the connection is made, the original wired connection may be dropped without losing state.

Shown below, is one illustrative example of a phone switch connection algorithm:
Preconditions: All Phone activity is done through a telephone intermediary.
1. Connect through new phone channel.
2. User picks up phone using new channel.
3. Disconnect from previous phone channel.

As depicted in FIG. 10, the location/property 150 is connected to Internet 130 via a phone proxy 180. When power is lost at property/location 150, phone connectivity switches from wired phone connection 190 to a mobile/wireless phone connection 200.

As indicated above, embodiments of the present invention allow the implementation of outlets (e.g., telephone and/or electrical) that may be automatically disconnected. The examples set forth hereinbelow describe utility outlets that may programmatically (e.g., via a remote device protocol such as X10) be physically disconnected from the main circuit. In essence, these outlets contain mechanical switches which physically break the connection to that outlet. It is noted that this physical break from these outlets will not disrupt other outlet connections to the main utility.

Figure 11:
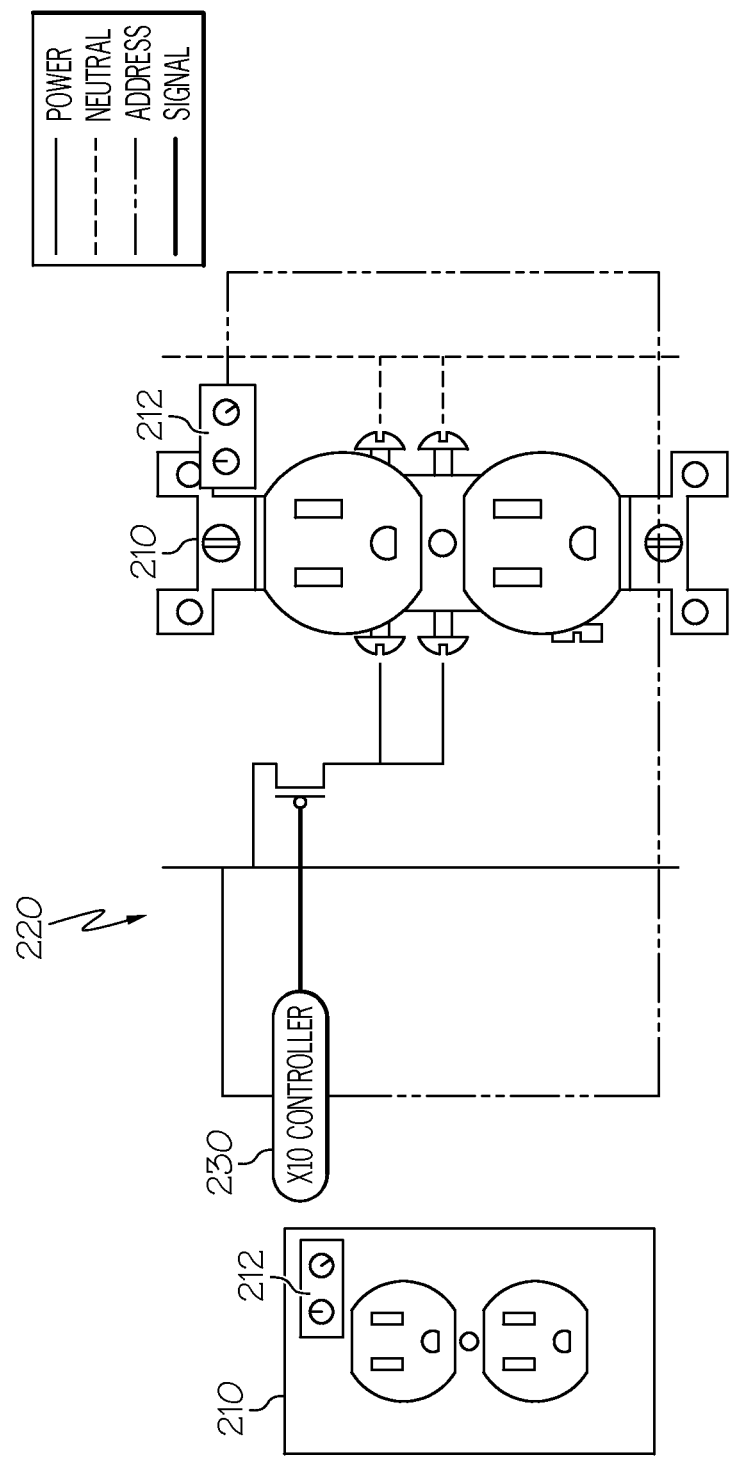
FIG. 11 depicts a single address power outlet and corresponding schematic according to an embodiment of the present invention.
Figure 12:
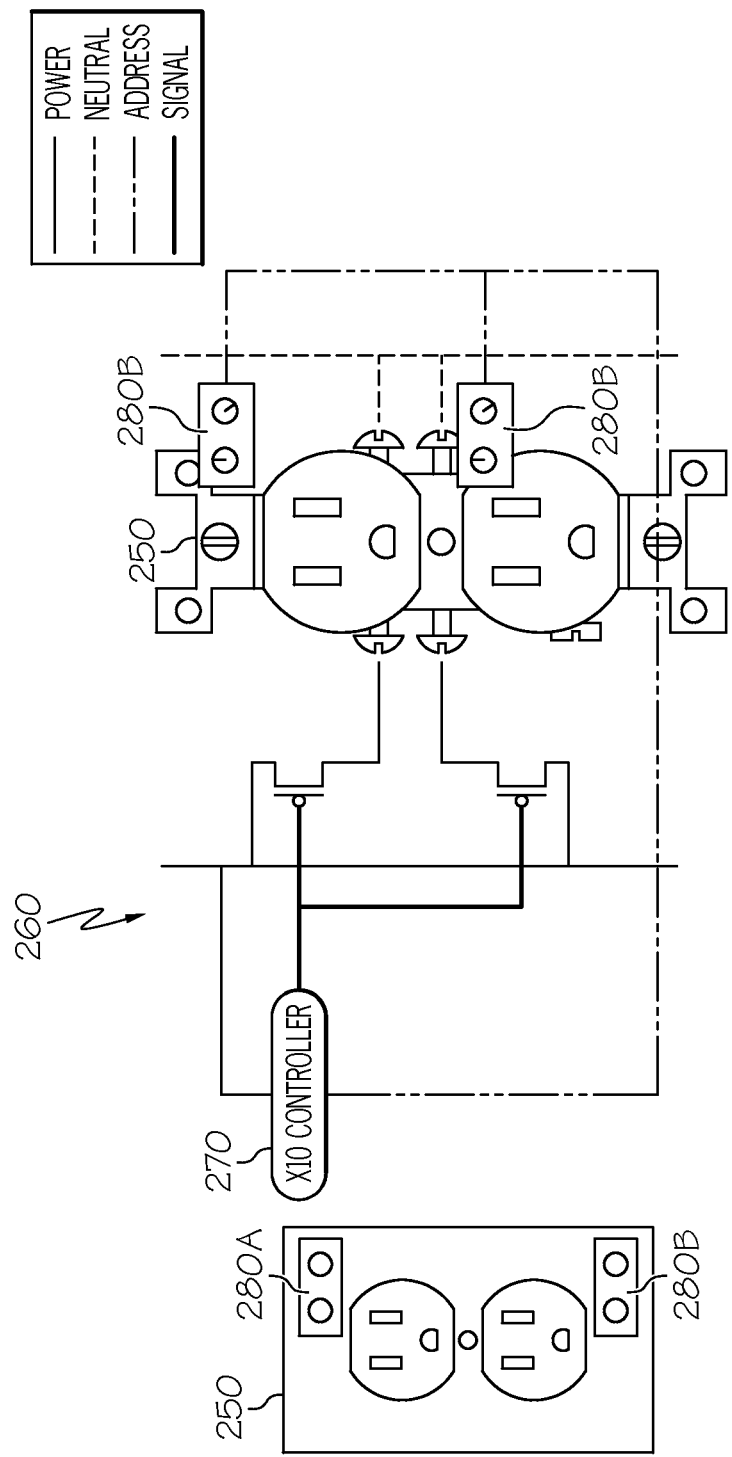
FIG. 12 depicts a dual address power outlet and corresponding schematic according to an embodiment of the present invention.

One type of utility outlet which must be physically disconnected during potential disturbance conditions is power outlets. There are multiple possible models for these outlets described herein. The first power outlet model shown in FIG. 11 shows a single addressable outlet 210 (having a single set of controls/addresses 212) connected via logic 220 to X10 controller 230. This embodiment physically breaks both connections on the same interface plate. Another second power outlet model shown in FIG. 12 comprises a dual addressable outlet 250 (having multiple sets of controls/addresses 280A-B) that is connected via logic 260 to X10 controller 270. This embodiment physically breaks each connection on the interface plate independently of each other. That is, each power outlet receives its own address.

Figure 13:
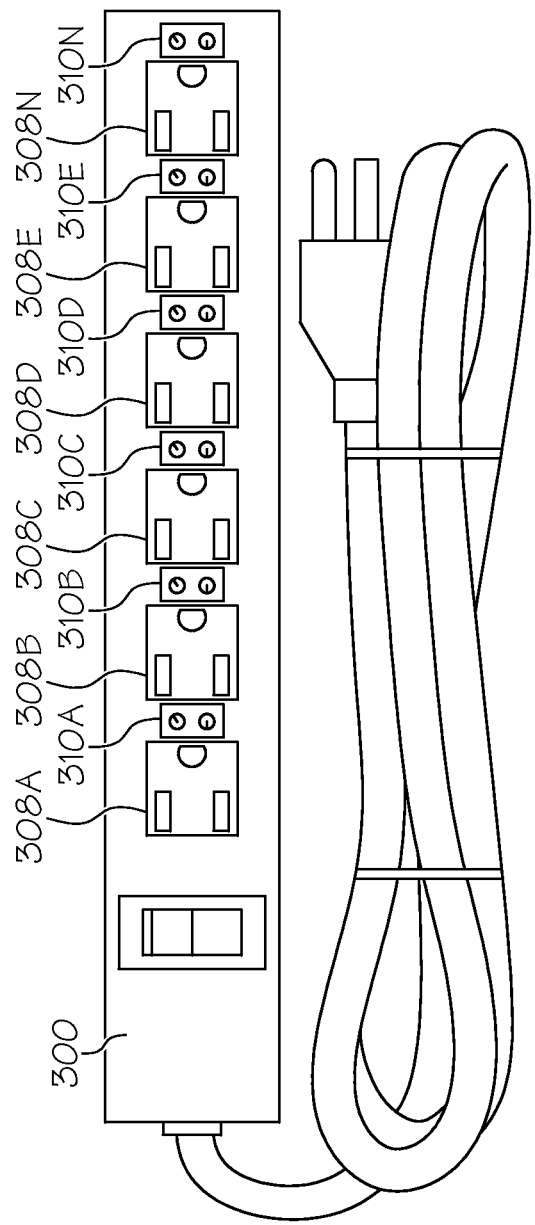
FIG. 13 depicts a power strip extension using remote controls according to an embodiment of the present invention.

Referring to FIG. 13, an example is shown applied to a power strip 300. As depicted, each outlet 308A-N has its own address/control function 310A-N for individual and independent control. Thus, electronic devices plugged into the power strip may still be individually controlled.

Figure 14:
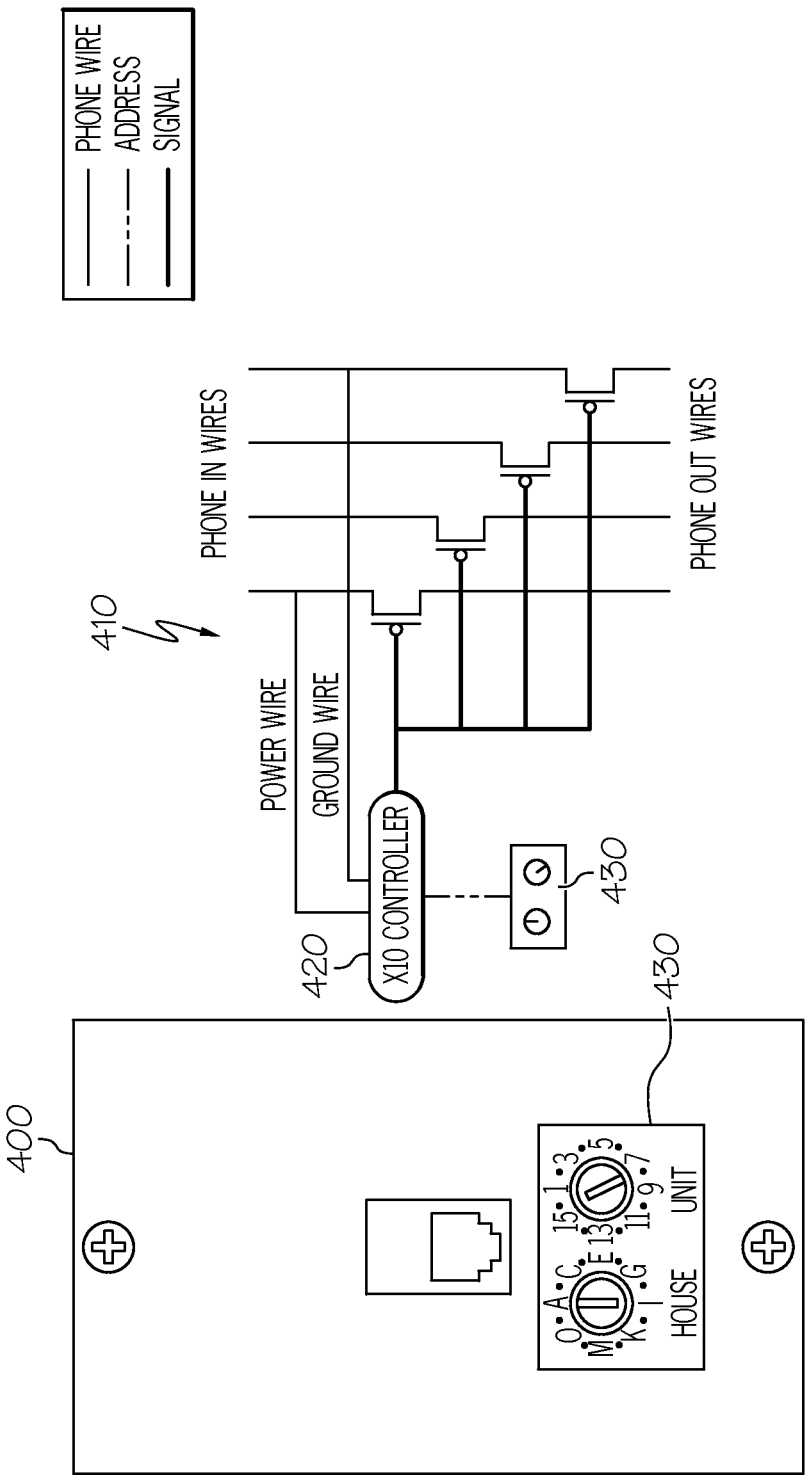
FIG. 14 depicts a phone outlet and corresponding schematic according to an embodiment of the present invention.

Referring to FIG. 14, an example is shown applied to a phone outlet 400. As depicted, outlet 400 includes a single set of controls/addresses 430 that is coupled to X10 controller 420 and logic 410. Similar to the power outlet, phone outlet 400 allows for the physical disconnection between the main phone utility and the phone appliance. In this scenario, the remote connection is powered using the small amount of power provided by the phone system.

Figure 15:
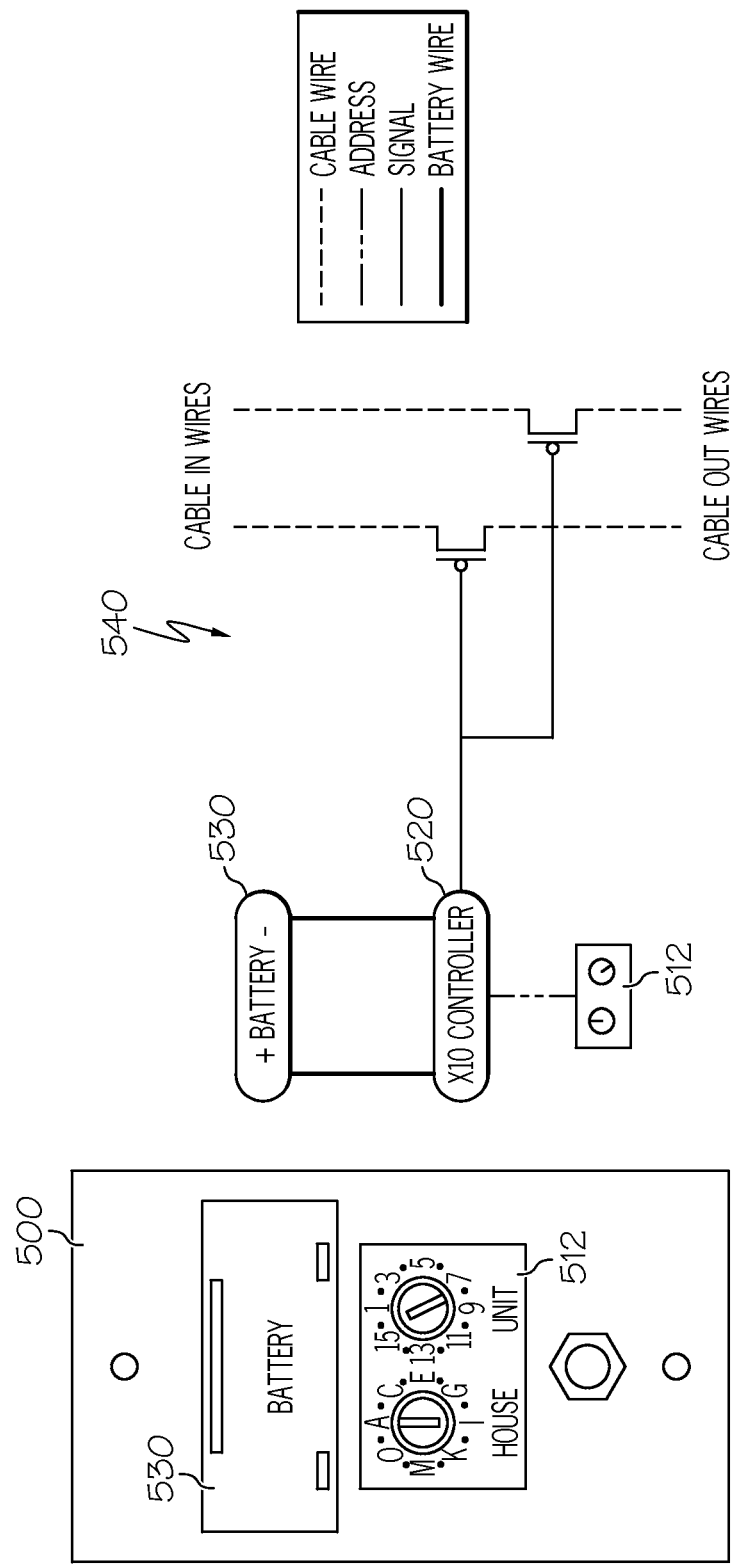
FIG. 15 depicts a cable television outlet and corresponding schematic according to an embodiment of the present invention.

Referring to FIG. 15, an example is shown applied to a cable television utility outlet 500, which may be programmatically disconnected from the cable utility. As depicted, the outlet comprises a single set of controls/addresses 512 and a battery 530 which are connected to X10 controller 520 and logic 540. Battery 530 is utilized since there is no readily available power source for the remote connection using the cable utility.

Figure 16:
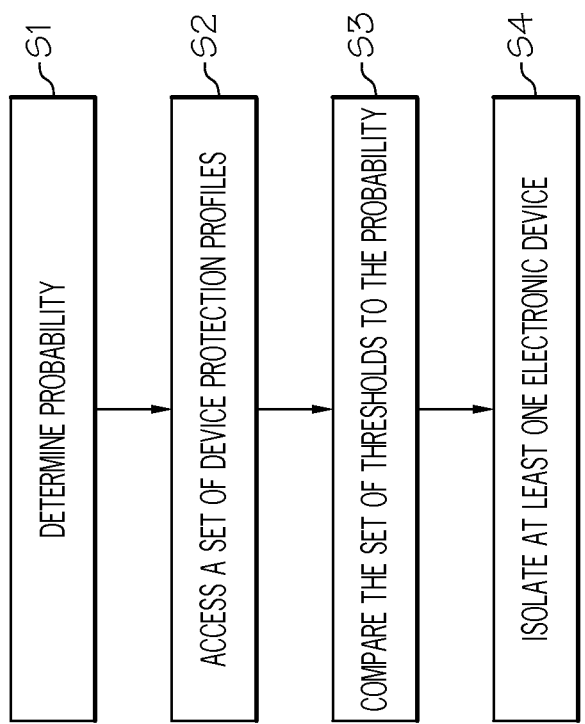
FIG. 16 depicts a method flow diagram according to an embodiment of the present invention.

Referring now to FIG. 16, a method flow diagram according to the present invention is shown. In step S1, a probability of an electrical disturbance occurring at a specified location is determined. In step S2, a set of device protection profiles is accessed from at least one computer storage device. As indicated above, the set of device protection profiles comprises a set of thresholds and a corresponding set of device topologies associated with a set of electronic devices positioned at the specified location. In step S3, the set of thresholds in the set of device protection profiles is compared to the probability to identify a matching device topology from the set of device topologies. In step S4, at least one electronic device of the set of electronic devices is isolated from an electrical power source according to the matching device topology. This may include stitching from a wired mode to a wireless mode (e.g., for a router/modem or the like)

While shown and described herein as a device protection system, it is understood that the invention further provides various alternative embodiments. For example, in one embodiment, the invention provides a computer-readable/useable medium that includes computer program code to enable a computer infrastructure to provide device protection functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium may comprise program code embodied on one or more portable structure storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide device protection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for a device protection. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable structure for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for protecting electronic devices from electrical disturbances, comprising:

determining, prior to an occurrence of an electrical disturbance, a numerical probability of an electrical disturbance on an electrical line in an electrical grid occurring at a future time at a specified location;

accessing a set of device protection profiles from at least one computer storage device, the set of device protection profiles comprising a set of thresholds having a plurality of thresholds and a corresponding set of device topologies associated with a set of electronic devices positioned at the specified location;

comparing the set of thresholds in the set of device protection profiles to the numerical probability to identify a matching device topology from the set of device topologies; and isolating at least one electronic device of the set of electronic devices from an electrical power source according to the matching device topology, the isolating further comprising: disconnecting, for the at least one electronic device that has a wired internet connection, the at least one electronic device from a proxy session used for the wired internet connection; switching the at least one electronic device from the wired internet connection to a wireless internet connection; and reconnecting to the proxy session using the wireless internet connection.

2. The computer-implemented method of claim 1, the comparing comprising:

identifying a specific threshold corresponding to the probability; and identifying a specific device topology that corresponds to the specific threshold.

3. The computer-implemented method of claim 1, each of the set of device topologies identifying a particular power connection configuration for the set of electronic devices positioned at the location.

4. The computer-implemented method of claim 1, the set of device protection profiles further specifying at least one characteristic selected from a group consisting of: a time of day, a day of the week, an air temperature, a number of people at the location, and an age of at least one person at the location.

5. The computer-implemented method of claim 4, the comparing being further based on the at least one characteristic.

6. The computer-implemented method of claim 1, the probability being determined based on at least one of the following: weather conditions, maintenance schedules, or historical disturbance data.

7. A system for protecting electronic devices from electrical disturbances, comprising:
- a memory medium comprising instructions;
- a bus coupled to the memory medium; and
- a processor coupled to the bus that when executing the instructions causes the system to:
  - determine, prior to an occurrence of an electrical disturbance, a numerical probability of an electrical disturbance on an electrical line in an electrical grid occurring at a future time at a specified location;
- access a set of device protection profiles from at least one computer storage device, the set of device protection profiles comprising a set of thresholds having a plurality of thresholds and a corresponding set of device topologies associated with a set of electronic devices positioned at the specified location;
  - compare the set of thresholds in the set of device protection profiles to the numerical probability to identify a matching device topology from the set of device topologies; and
  - isolate at least one electronic device of the set of electronic devices from an electrical power source according to the matching device topology, the instructions for causing the system to isolate further comprising instructions for causing the system to: disconnect, for the at least one electronic device that has a wired internet connection, the at least one electronic device from a proxy session used for the wired internet connection; switch the at least one electronic device from the wired internet connection to a wireless internet connection; and reconnect to the proxy session using the wireless internet connection.

8. The system of claim 7, the memory medium further comprising instructions for causing the system to:
- identify a specific threshold corresponding to the probability; and
- identify a specific device topology that corresponds to the specific threshold.

9. The system of claim 7, each of the set of device topologies identifying a particular power connection configuration for the set of electronic devices positioned at the location.

10. The system of claim 7, the set of device protection profiles further specifying at least one characteristic selected from a group consisting of: a time of day, a day of the week, an air temperature, a number of people at the location, and an age of at least one person at the location.

11. The system of claim 10, the matching device topology being further identified based on the at least one characteristic.

12. The system of claim 7, the probability being determined based on at least one of the following: weather conditions, maintenance schedules, or historical disturbance data.

13. A computer program product for protecting electronic devices from electrical disturbances, the computer program product comprising a computer readable storage device, wherein the computer readable storage device is not a transitory signal, and program instructions stored on the computer readable storage device, to:
- determine, prior to an occurrence of an electrical disturbance, a numerical probability of an electrical disturbance on an electrical line in an electrical grid occurring at a future time at a specified location;
- access a set of device protection profiles from at least one computer storage device, the set of device protection profiles comprising a set of thresholds having a plurality of thresholds and a corresponding set of device topologies associated with a set of electronic devices positioned at the specified location;
- compare the set of thresholds in the set of device protection profiles to the numerical probability to identify a matching device topology from the set of device topologies; and
- isolate at least one electronic device of the set of electronic devices from an electrical power source according to the matching device topology, the instructions to isolate further comprising instructions stored on the computer readable storage device to: disconnect, for the at least one electronic device that has a wired internet connection, the at least one electronic device from a proxy session used for the wired internet connection; switch the at least one electronic device from the wired internet connection to a wireless internet connection; and reconnect to the proxy session using the wireless internet connection.

14. The computer program product of claim 13, the computer readable storage device further comprising instructions to:
- identify a specific threshold corresponding to the probability; and
- identify a specific device topology that corresponds to the specific threshold.

15. The computer program product of claim 13, each of the set of device topologies identifying a particular power connection configuration for the set of electronic devices positioned at the location.

16. The computer program product of claim 13, the set of device protection profiles further specifying at least one characteristic selected from a group consisting of: a time of day, a day of the week, an air temperature, a number of people at the location, and an age of at least one person at the location.

17. The computer program product of claim 16, a matching device topology being further identified based on the at least one characteristic.

18. The computer program product of claim 13, the probability being determined based on at least one of the following: weather conditions, maintenance schedules, or historical disturbance data.

19. A method for deploying a system for protecting electronic devices from electrical disturbances, comprising:
- providing a computer infrastructure being operable to:
  - determine, prior to an occurrence of an electrical disturbance, a numerical probability of an electrical disturbance on an electrical line in an electrical grid occurring at a future time at a specified location;
  - access a set of device protection profiles from at least one computer storage device, the set of device protection profiles comprising a set of thresholds having a plurality of thresholds and a corresponding set of device topologies associated with a set of electronic devices positioned at the specified location;

compare the set of thresholds in the set of device protection profiles to the numerical probability to identify a matching device topology from the set of device topologies; and isolate at least one electronic device of the set of electronic devices from an electrical power source according to the matching device topology, the computer infrastructure operable to isolate further comprising the computer infrastructure being operable to: disconnect, for the at least one electronic device that has a wired internet connection, the at least one electronic device from a proxy session used for the wired internet connection; switch the at least one electronic device from the wired internet connection to a wireless internet connection; and reconnect to the proxy session using the wireless internet connection.

* * * * *